Dec. 25, 1934.                 C. BOOTH                 1,985,237
                            GRINDING MACHINE
                          Filed May 20, 1927            10 Sheets-Sheet 1

INVENTOR
Clement Booth
BY
Robert S. Blair
ATTORNEY

Dec. 25, 1934.    C. BOOTH    1,985,237
GRINDING MACHINE
Filed May 20, 1927    10 Sheets-Sheet 2

Dec. 25, 1934.   C. BOOTH   1,985,237
GRINDING MACHINE
Filed May 20, 1927   10 Sheets-Sheet 4

INVENTOR
Clement Booth
BY Robert S. Blair
ATTORNEY

Dec. 25, 1934.  C. BOOTH  1,985,237
GRINDING MACHINE
Filed May 20, 1927  10 Sheets-Sheet 5

INVENTOR
Clement Booth
BY
Robert L. Blair
ATTORNEY

Dec. 25, 1934.   C. BOOTH   1,985,237
GRINDING MACHINE
Filed May 20, 1927   10 Sheets-Sheet 6

INVENTOR
Clement Booth
BY Robert S. Blair
ATTORNEY

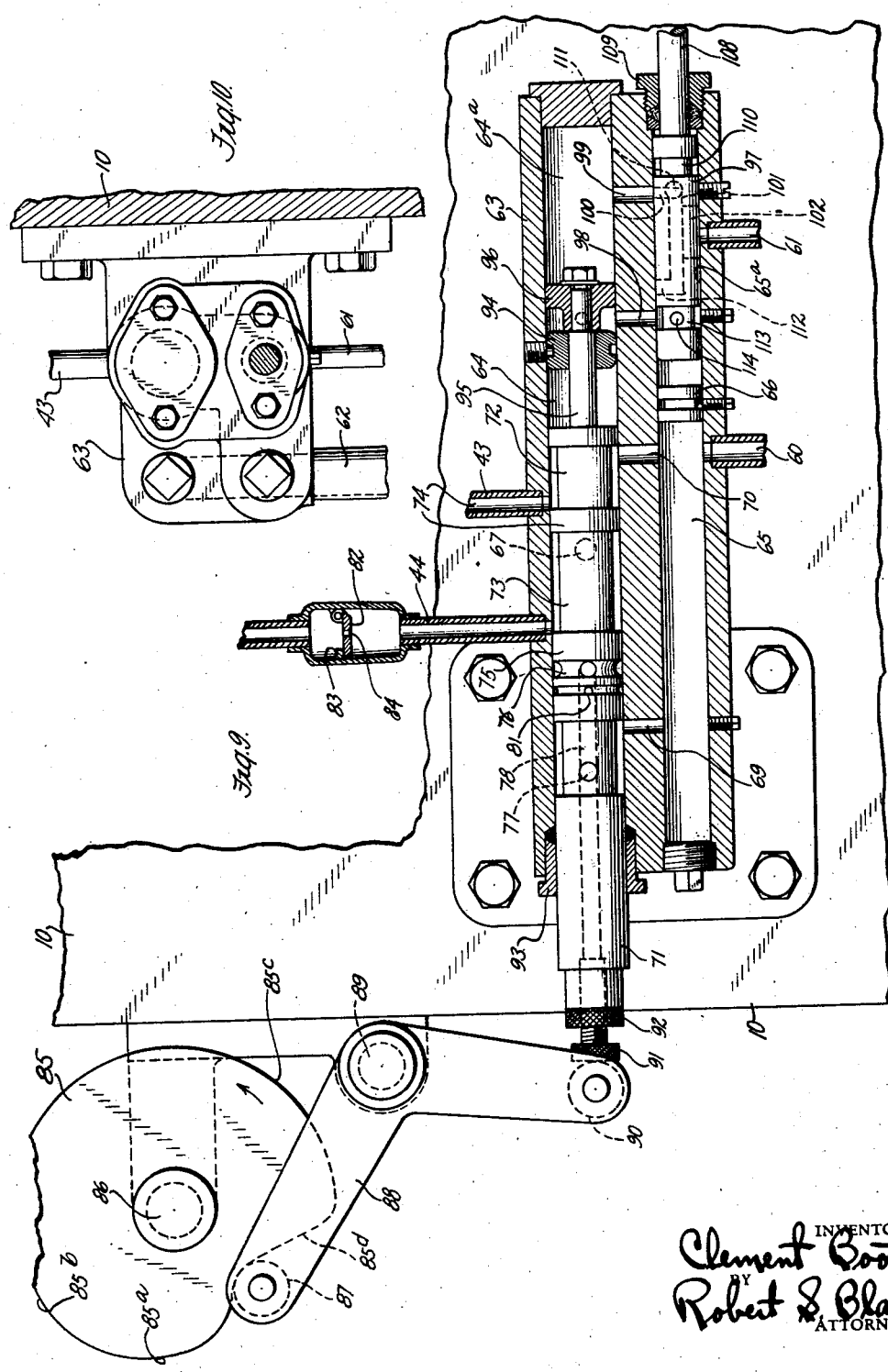

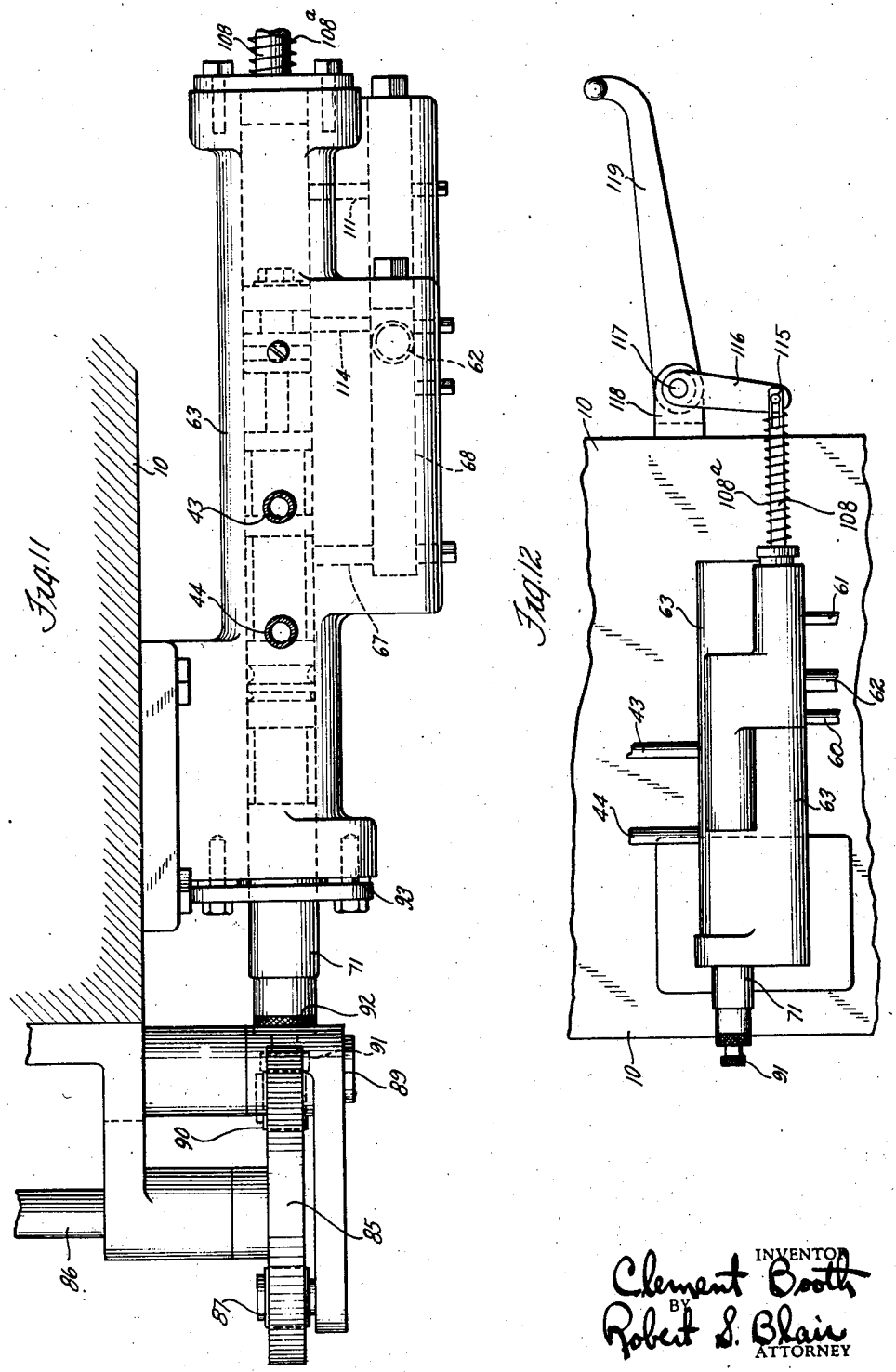

Dec. 25, 1934.  C. BOOTH  1,985,237

GRINDING MACHINE

Filed May 20, 1927  10 Sheets-Sheet 9

Dec. 25, 1934.  C. BOOTH  1,985,237
GRINDING MACHINE
Filed May 20, 1927    10 Sheets-Sheet 10
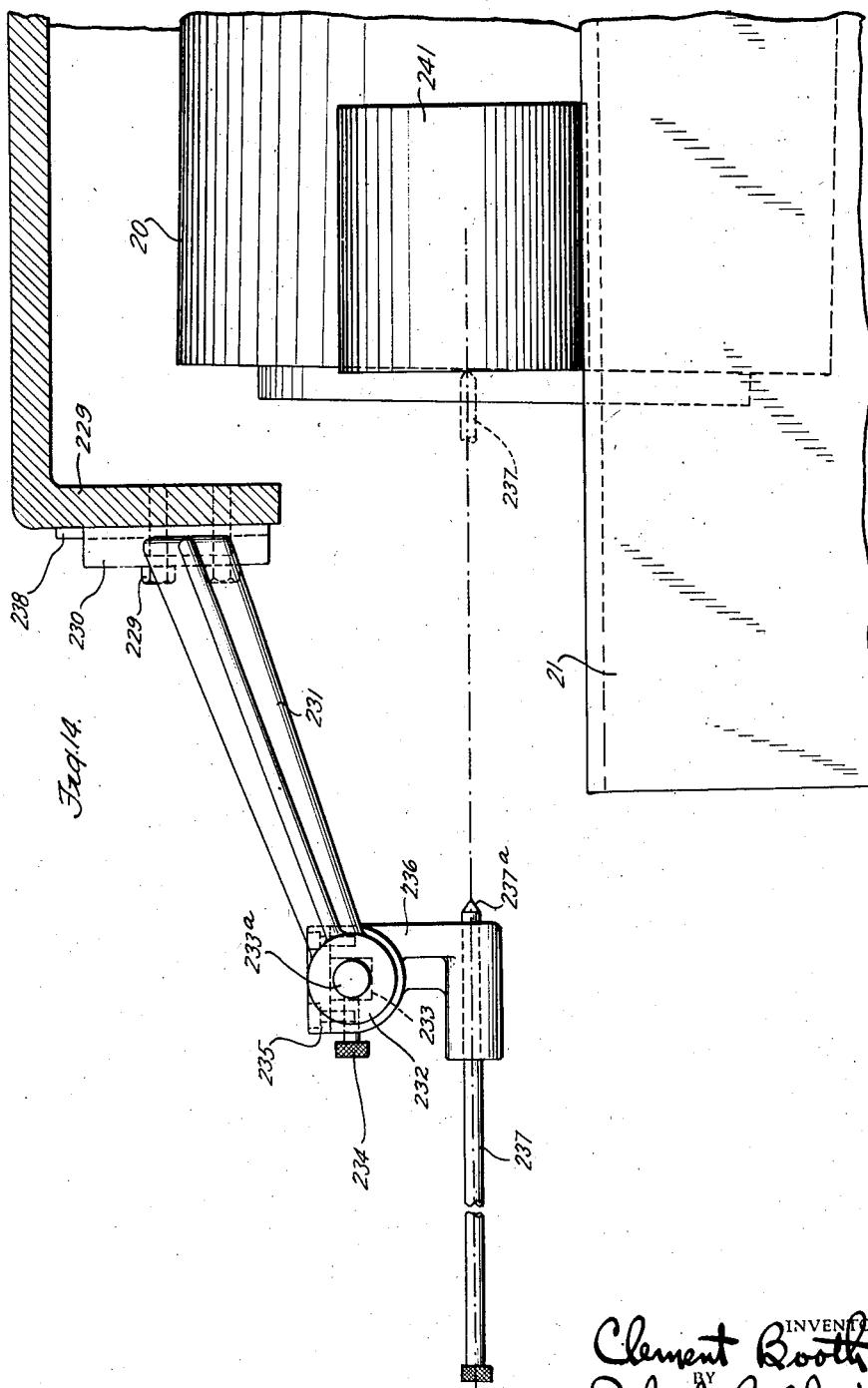

Patented Dec. 25, 1934

1,985,237

UNITED STATES PATENT OFFICE 1,985,237

GRINDING MACHINE

Clement Booth, Danbury, Conn., assignor to Cincinnati Grinders Incorporated, a corporation of Ohio Application May 20, 1927, Serial No. 192,878

39 Claims. (Cl. 51—48)

This invention relates to grinding machines and more particularly to centerless grinding machines.

One of the objects of the invention is to provide a machine of the above nature which is practical and highly efficient. Another object is to provide a machine of the above nature which is capable of a wide range of use and of accurate operation under all conditions. Another object is to provide a machine of the above nature which is rugged and dependable even under the most severe operating conditions. Another object is to provide a machine of the above nature which is of simple and compact construction. Another object is to provide a machine of the above nature which is convenient to operate and to adjust to meet varying conditions of use. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawings, in which is shown one of the various possible embodiments of this invention, Figure 1 is a vertical longitudinal section through the machine;

Figure 9 is a vertical section through a valve mechanism which is mounted on the left-hand end of the machine, and which is seen in plan view in Figure 3;

Figure 10 is a view from the right-hand end of Figure 9;

Figure 11 is a top plan view of the parts shown in Figures 9 and 10;

Figure 12 is a side elevation of the same parts shown on a smaller scale;

Figure 13 is a front elevation of a portion of the machine showing a mechanism for use in connection with truing one of the wheels; and Figure 14 is a section taken as indicated by the line 14—14 of Figure 13.

Similar reference characters refer to similar parts throughout the several views of the drawings.

Figure 1:
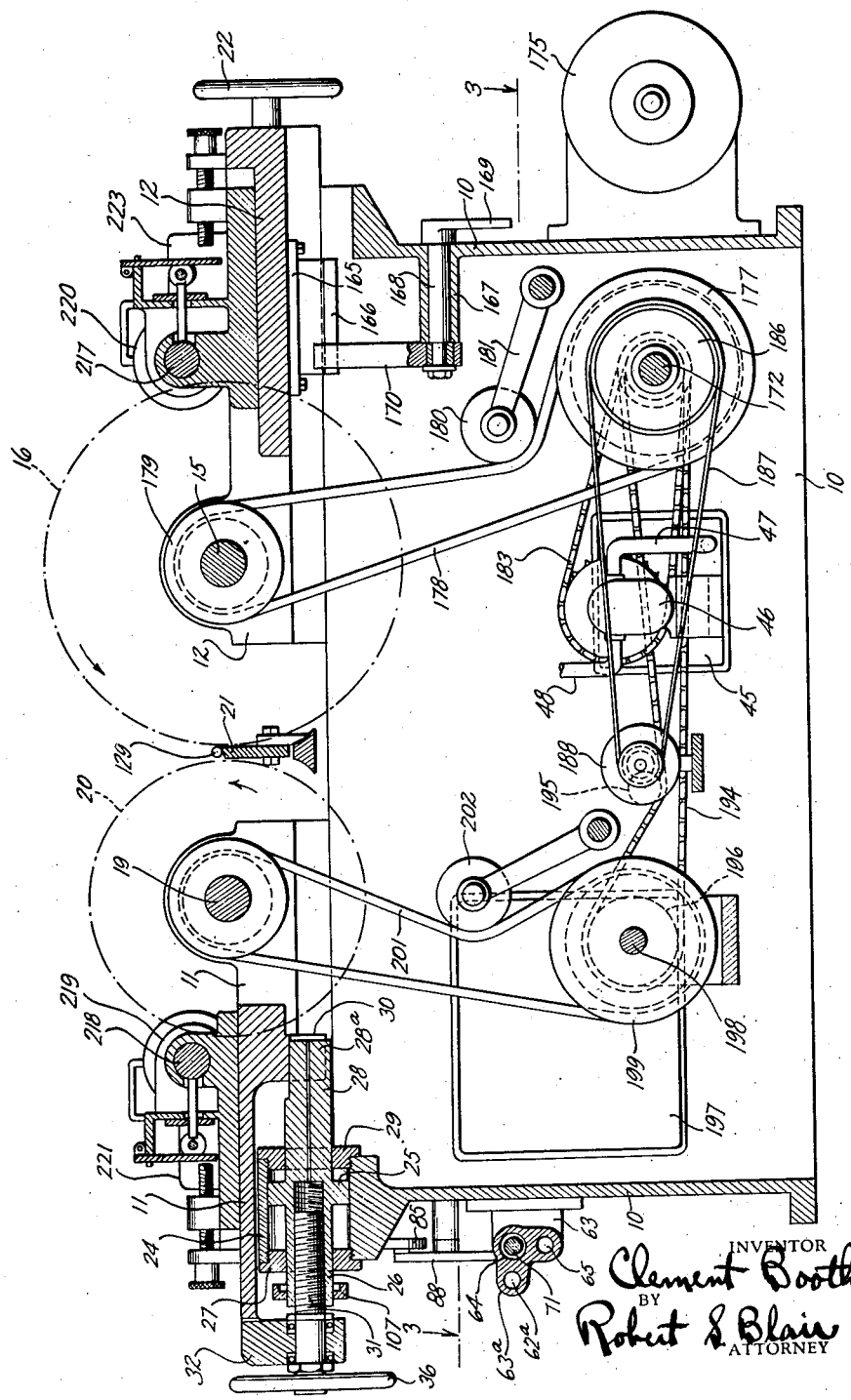
Figure 2:
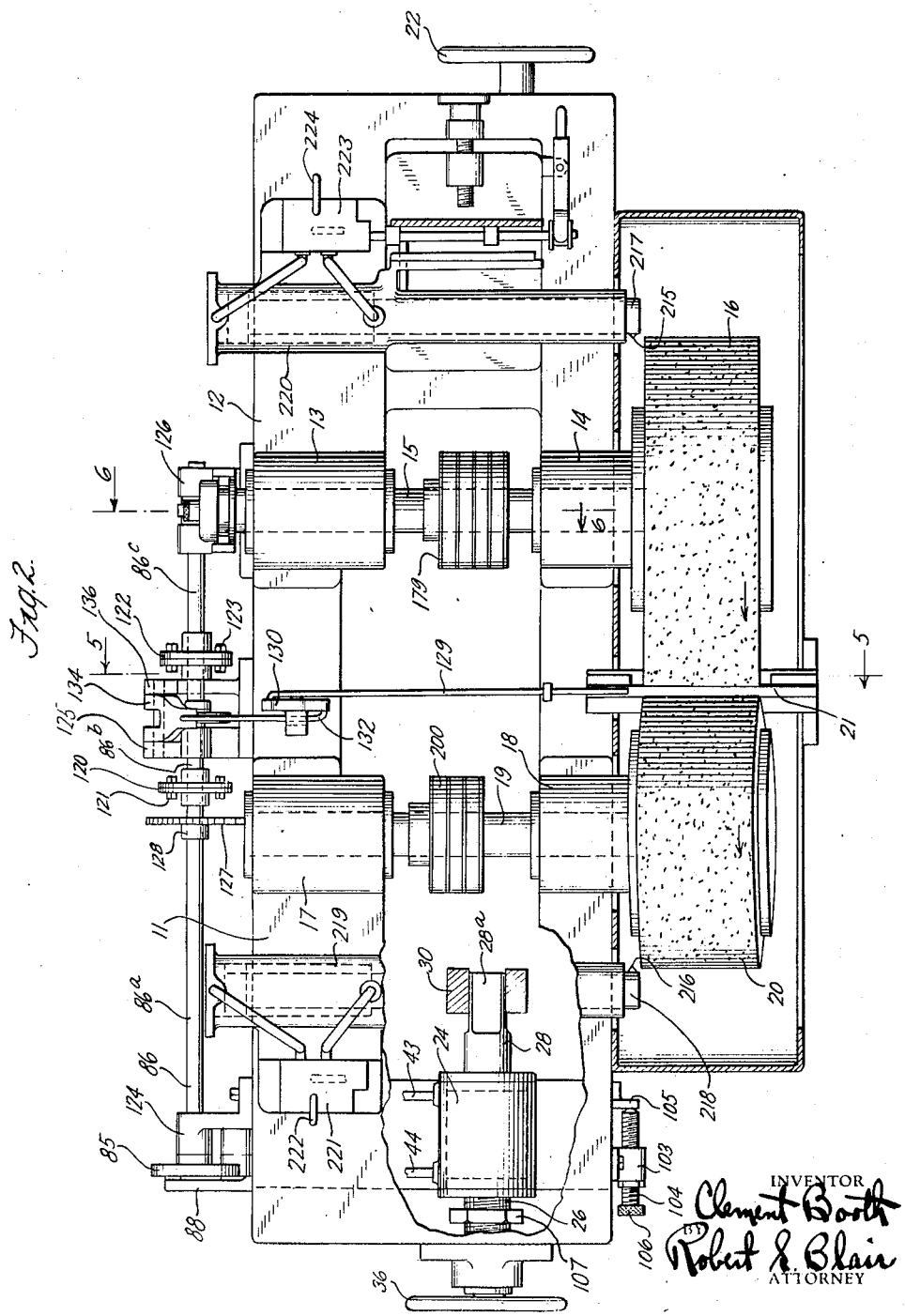
Figure 2 is a top plan view with parts broken away.

Referring now to the drawings in detail, and first to Figures 1 and 2, the frame 10 of this machine comprises a hollow construction substantially rectangular in shape and of a suitable height to support the mechanisms carried thereby at a convenient working elevation. Supported upon this frame are a pair of slides 11 and 12, which are mounted in suitable ways for movement longitudinally of the machine and toward and away from each other. As seen in Figure 2, the slide 12 has formed at its left-hand end a pair of bearings 13 and 14 in which is rotatably mounted a heavy shaft 15. Mounted upon the shaft 15, at its forward end and overhanging the front of the frame, is a wheel 16. The slide 11 has formed thereon at its right-hand end a pair of bearings 17 and 18 in which is rotatably mounted a shaft 19, the shaft 19 carrying at its forward end a wheel 20 which is thus positioned adjacent to the wheel 16.

The wheel 16 is a grinding wheel and is adapted to be rotated rapidly in the direction indicated by the arrows thereon. The wheel 20 is a regulating wheel and is adapted to be rotated in the direction indicated by the arrow thereon at a much slower speed than that of the grinding wheel 16. The regulating wheel may be, and preferably is, made of an abrasive material similar to that of the grinding wheel 16. Between the adjacent operative faces of the two wheels is positioned a member 21 which is adapted to support the work to be operated upon by the wheels.

The operative surface of the grinding wheel 16 at the line of contact with the work moves toward the work supporting member 21, or in this instance downwardly. The operative surface of the regulating wheel 20, at its line of contact with the work, moves in a direction away from the surface of the work support 21. The grinding wheel 16 and the regulating wheel 20 thus present to the work operative surfaces traveling in opposite directions, the surface speed of the grinding wheel being a suitable grinding speed and the surface speed of the regulating wheel being much slower. The regulating wheel 20 is thus adapted to grip the surface of the work and move the surface of the work at a constant rate of drive corresponding to the surface speed of the operative surface of the slowly moving regulating wheel. As the work is thus controlled and rotated by the regulating wheel 20, the rapidly rotating grinding wheel is adapted to grind the work down to an accurate diameter determined by the distance between the opposite points of contact of the work with the two wheels.

The grinding machine shown herein is adapted for grinding to accurate predetermined size work of round cross-section. When the work being operated upon is cylindrical, the surface of the work support 21 and the path of movement of the operative face of the regulating wheel 20 are preferably inclined with respect to each other, so that the regulating wheel, in addition to rotating the work at a constant and uniform speed, and uniformly presenting the surface of the work to the grinding wheel, exerts a feeding component upon the cylindrical work, feeding the work with a uniform speed along the surface of the work support and across the grinding wheel surface. The angularity between the path of movement of the work and the path of movement of the operative surface of the regulating wheel may be brought about conveniently by tilting the regulating wheel 20, as is indicated in Figure 2. This tilting may be accomplished conveniently by a slight raising of the front bearing 18 of the regulating wheel shaft 19.

The grinding wheel 16, the regulating wheel 20, and the work supporting means 21, form together what may be termed a grinding throat for the reception of the work to be operated upon. When the work being operated upon is cylindrical throughout, such, for example, as rolls for roller bearings or longer rods of the like, the work may fed into the grinding throat from the front of the machine and be fed therethrough by the inclined regulating wheel and discharged at the rear. However, when the work is not cylindrical throughout, but is of varying diameter, or when the work is provided with a projection such as a headed bolt, the work cannot be fed all the way through between the wheels. In such case, it is necessary to enlarge the grinding throat in order to remove the work when the grinding operation thereon is completed. Also, it is oftentimes necessary to enlarge the grinding throat to permit insertion of the work. It therefore becomes desirable to provide means for enlarging and restricting the grinding throat. When the work rest 21 is fixed, as in the embodiment shown herein, it becomes necessary to move one of the wheels toward and away from the other in order respectively to restrict and enlarge the grinding throat.

Referring again to Figure 2 of the drawings, the slide or carriage 12 in which the grinding wheel 16 is carried is provided with a suitable feed screw operated by a hand wheel 22 by means of which the carriage 12 and hence the grinding wheel may be advanced toward or withdrawn away from the work support 21. The regulating wheel carriage 11 is also provided with means whereby it may be moved manually toward and away from the grinding wheel carriage, as will be described presently. In addition, the regulating wheel carriage 11 is provided with a power driven mechanism which operates automatically for moving the regulating wheel toward and away from the grinding wheel to alternately restrict and enlarge the grinding throat, when the machine is being used for grinding work which is not cylindrical throughout and hence cannot be fed between the two wheels. It will be understood that this reciprocating mechanism might be applied to the grinding wheel carriage, but preferably the movement for separating the wheels is given to the regulating wheel.

The motive power for reciprocating the slide or carriage 11 carrying the regulating wheel is preferably hydraulic. Secured to or suitably formed integrally with the main frame 10 is a cylinder 24 which, in the embodiment shown, is positioned beneath the carriage 11 adjacent the central portion thereof. Referring to Figure 1, within this cylinder 24 is a double acting piston 25 which is adapted to be moved back and forth in the cylinder by means of fluid under pressure. The piston is provided with a hub 26 extending outwardly from the cylinder toward the left-hand end of the machine through a suitable stuffing box in the end wall 27 of the cylinder. At the other end of the piston a hub 28 thereof passes outwardly toward the center of the machine through the end wall 29 of the cylinder. The hub portion 28 is provided adjacent its end with a squared portion 28a which slidably engages with a downwardly projecting lug 30 of the carriage 11. This engagement of the part 28a and the part 30 permits relative longitudinal movement of the piston 25 and the carriage 11 but holds the piston against rotation.

The hub 26 of the piston is hollow and is interiorly threaded, coacting with a screw 31 which passes through a lug or bracket 32 secured to and depending from the left-hand end of the carriage 11. The screw 31 is held against axial movement in the bracket 32 but is rotatable therein. At the outer end of the screw 31 is a suitable hand wheel 36 by means of which the screw may be rotated.

The screw 31 forms a threaded connection between the piston 25 and the carriage 11. This connection may be adjusted by rotating the screw 31 by means of the hand wheel 36, thereby adjusting the relative positions of the piston 25 and the carriage 11.

When fluid pressure is applied to the right-hand side of the piston 25, the carriage 11 will be moved to the left to move the regulating wheel 20 away from the work support and to thereby enlarge the grinding throat, and when this fluid pressure is removed and fluid pressure is applied to the left-hand side of the piston, the carriage 11 will be moved to carry the regulating wheel 20 toward the work support to restrict the grinding throat and engage the work therein. The path of movement of the carriage 11 and hence of the regulating wheel 20 may be adjusted by turning the screw 31 by means of the hand wheel 36. Thus, if the hand wheel is turned to thread the screw 31 further into the hub of the piston 25, the regulating wheel will, upon its forward movement, move more closely to the grinding wheel 16 so as to engage work of smaller section. To operate upon work of larger section, the connection between the piston and the carriage may be changed, if necessary, by turning the hand wheel 36 to thread the screw 31 in a direction out of the piston hub.

Referring now to Figure 2, there are shown two pipes 43 and 44 which connect with the interior of the cylinder 24 at the right and left sides respectively of the piston 25. These pipes carry to and from the cylinder the fluid for operating the piston, and they connect with a valve mechanism which controls the flow of fluid therethrough. The fluid preferably employed is a suitable oil, and in Figure 8 there is diagrammatically represented the fluid circuits employed.

There is provided a supply tank 45 from which a pump 46 draws the oil through a pipe 47 and forces it under pressure through a main feed pipe 48. Connected with the feed pipe 48 is a by-pass 49 which leads back to the supply tank 45 and in which is positioned a relief valve 50. This relief valve may be of any suitable construction and is adapted to open at a predetermined pressure to permit the discharge from the pump to pass back into the supply tank. Also, between the main feed pipe 48 and the exhaust to the tank is a valve 51. This valve 51 is normally closed, but when the fluid pressure is not being used the valve 51 is opened to permit the pump to discharge directly back into the supply tank. Thus, when the hydraulic mechanism of the machine is not being employed, the pump, which is preferably of the usual rotary type, simply runs freely and lubricates itself by the oil flowing therethrough.

In the main feed pipe 48 is a valve 52 and beyond this valve the pipe empties into three branch pipes 53, 54 and 55, in which are provided suitable valves 56, 57 and 58, respectively. The pipe 53 is for leading the fluid under pressure to operate the piston 25 contained in the cylinder 24. The pipes 54 and 55 are for leading the fluid to the pistons for operating the wheel truing mechanisms which will be referred to hereinafter.

Figure 8:
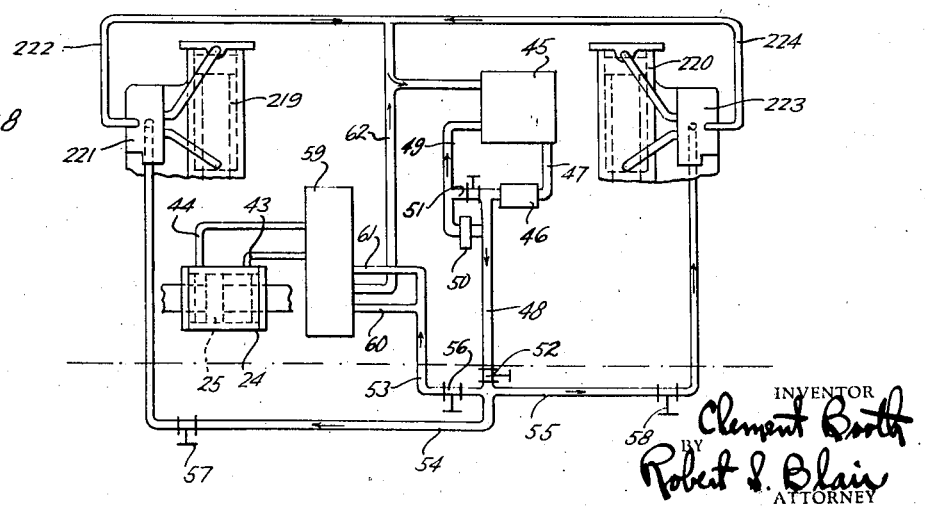
Figure 8 is a diagrammatic view of the fluid circuit employed.

Referring still to Figure 8, there is shown the cylinder 24 and the two pipes 43 and 44 communicating with the interior thereof, one on either side of the piston 25. These pipes lead from the cylinder 24 to a valve mechanism indicated in Figure 8 by the numeral 59. Leading into the valve mechanism 59 are two supply pipes 60 and 61 branching from the pipe 53 which communicates with the main feed pipe 48. Leaving the valve mechanism 59 is a discharge pipe 62 leading back to the supply tank 45.

Considering now more particularly the construction and operation of the valve mechanism indicated at 59 in Figure 8, reference is had to Figures 9, 10 and 11. Referring to Figure 9, a casting 63 is provided in which are formed two longitudinal passages 64 and 65, positioned one above the other. The pipes 43 and 44 which lead to the cylinder 24 communicate with the passage 64, and the feed pipe 60 communicates with the passage 65. The feed pipe 61 opens into a right-hand portion 65a of the passage 65, which portion is cut off from the remainder of the passage by a suitable plug 66, for a purpose which will be made clear hereinafter. Leading from the passage 64 is an exhaust opening 67, which is shown in dotted lines in Figure 11, and which communicates with a passage 68 opening into the exhaust or discharge pipe 62.

Referring again to Figure 9, the passage 65 is in communication with the passage 64 by two connecting passages 69 and 70. Within the passage 64 is a slide or piston 71 which is adapted to be reciprocated longitudinally, as will be described later, and to control the several ports so as to first connect the pipe 43 with the fluid supply and the pipe 44 with discharge and then to connect the pipe 43 with the discharge and the pipe 44 with the fluid supply.

In the position of the parts shown in the drawings, and as viewed in Figure 9, the slide 71 is at the end of its movement to the left. An under-cut portion 72 of the slide registers with both the pipe 43 and the passage 70 so that the fluid under pressure is being admitted to the pipe 43 and thence passing to the right-hand side of the piston 25 to move the regulating wheel away from the work. An under-cut portion 73 of the slide 71 registers with the pipe 44 and with the discharge opening 67 so that the left-hand side of the piston 25 is connected with the discharge pipe 62. The regulating wheel is thus moved away from the work and to enlarge the grinding throat.

When the slide 71 now moves to the right, as viewed in Figure 9, the portion 74 thereof cuts off the pipe 43 and the portion 75 thereof cuts off the pipe 44. Upon continued movement of the slide 71 to the right, the under-cut portion 73 comes into registry with the pipe 43, thereby connecting the pipe 43 with the discharge pipe, and the under-cut portion 76 comes into registry with the pipe 44, thereby admitting the fluid under pressure to the left-hand side of the piston 25 to start the movement of the regulating wheel toward the work. The fluid under pressure gains access to the under-cut portion 76 from the passage 69 through an opening 77, an axial passage 78 extending through the slide and an opening 79. As the movement of the slide 71 to the right continues, the pipe 43 continues in connection with discharge and a narrower under-cut portion 80 comes into registry with the pipe 44. This narrow under-cut portion 80 communicates with the passage 78 in the slide through a small opening 81. The effect of the narrow portion 80 coming into registry with the pipe 44, in place of the wider under-cut portion 76, is to restrict the flow of the fluid through the pipe 44 and hence to slow down or decelerate the movement of the regulating wheel slide during the last portion of its movement to restrict the grinding throat. It will be understood that other means may be employed to restrict the flow of fluid through the pipe 44, the use of the auxiliary groove 80 illustrating one possible embodiment.

From the description of the valve mechanism thus far, it will be seen that a reciprocating movement imparted to the slide 71 will effect a reciprocation of the piston 25 and consequently a movement of the regulating wheel to alternately restrict and enlarge the grinding throat. It is desirable that the regulating wheel on its in-stroke move more slowly than on the return stroke. Accordingly, a device is provided in the pipe 44 for permitting a more rapid flow of the fluid in a direction away from the piston than in the opposite direction. As shown in Figure 9, there is provided in the pipe 44 a check valve comprising a pivoted plate 82 which swings against a stop 83. The plate 82 has therethrough a restricted opening 84. When the regulating wheel is on its return stroke and the fluid is flowing outwardly from the cylinder 24 through the pipe 44, the valve 82 swings open and permits a rapid flow. When the regulating wheel is on the in-stroke and the fluid under pressure is flowing through the pipe 44 to the cylinder 24, the fluid pressure holds the valve 82 against the stop 83 and consequently the fluid is required to pass through the small opening 84, its rate of flow being thereby greatly decreased. In addition, as the regulating wheel slide approaches the end of its in-stroke, its speed of movement is further decreased by the restricted opening 81 coming into play. As the valve slide 71 is reciprocated, therefore, the regulating wheel reciprocates, moving slowly toward the work, then very slowly during the latter portion of this movement and as the grinding is being performed, and then withdrawing more rapidly.

The valve slide 71 is reciprocated preferably by a cam 85 which is mounted upon a shaft 86 at the rear of the machine. This shaft will be referred to later herein. The cam 85 engages a roller 87 which is carried in the end of a bell crank lever 88 pivoted to the frame at 89. The other end of the bell crank carries a roller 90 which engages the head of a screw 91 threaded into the end of the valve slide 71. The position of the valve slide with respect to the roller 90 may be adjusted by the screw 91 which is provided with a lock nut 92. The end of the valve slide on which the screw 91 is mounted projects from the end of the valve casting 63 through a suitable packing held in place by a bushing 93.

Still referring to Figure 9, the right-hand end portion 64a of the passage 64 is closed off by a suitable plug 94. An end portion 95 of the slide 71 projects through the plug 94 and, within the chamber portion 64a, is provided with a piston-like part 96. Fluid pressure acting against the right-hand side of the part 96 normally urges the slide 71 to the left and holds the end thereof against the roller 90. This fluid pressure is supplied by the supply pipe 61. In the portion 65a of the passage 65, with which the pipe 61 communicates, is a slide 97. The passage portion 64a is in communication with the passage portion 65a by two passages 98 and 99 which open into the part 64a on opposite sides of the member 96. In the position of the parts shown in the drawings, the passage 99 is in registry with an opening 100 which connects with an axial passage 101 in the slide 97. The passage 101 is in communication with the supply pipe 61 by a groove 102 in the slide 97. Thus, the fluid pressure has access to the right-hand side of the part 96 through the passage 101, the opening 100 and the passage 99, to hold the valve slide 71 up against the roller 90 and hence to hold the roller 87 against the surface of the cam 85.

As the parts are positioned in the drawings, the valve slide 71 is at the left-hand end of its movement and the roller 87 rests in an under-cut portion of the cam 85. As the cam now rotates in the direction indicated by the arrow thereon, the roller 87 quickly mounts to the higher portion 85a of the cam, forcing the valve slide 71 to the the right and starting a rapid inward movement of the regulating wheel by bringing the under-cut portion 76 into registry with the pipe 44. As the cam continues to rotate, the still higher portion 85b thereof moves across the roller 87, forcing the valve slide 71 more gradually further to the right and bringing the restricted under-cut portion 80 into registry with the pipe 44. The port 80 continues in registry with the pipe 44 until after the regulating wheel has reached the limit of its inward movement and the grinding operation is being performed upon the work, the roller riding upon a substantially concentric portion 85c of the cam, and the slide 71 being held stationary until the grinding operation is completed. Thereupon, the under-cut portion 85d of the cam moves into position to engage the roller 87 and the slide 81 moves quickly to the left and to the position shown in the drawings to effect a rapid withdrawal of the regulating wheel. This action is repeated as the cam continues to rotate.

Referring to Figure 2, there is secured to the front side of the regulating wheel slide 11 a bracket 103 in which is threaded a screw 104 and, upon the frame 10 in line with the path of movement of the screw 104 is a fixed abutment 105. The screw 104 forms an adjustable stop which limits the movement of the carriage 11 to the right and its movement to restrict the grinding throat. The screw is provided with a locking nut 106 by means of which it may be locked in the position to which it is adjusted. The carriage 11 may move inwardly under the urge of the fluid acting upon the left-hand side of the piston 25 until the end of the screw 104 comes against the abutment 105, whereupon the movement of the carriage is arrested.

Considering now more in detail the action of the parts just described, the procedure is substantially as follows. Starting with the parts positioned as shown in the drawings, that is, with the regulating wheel withdrawn and the valve mechanism in the position shown in Figure 9, now as the cam 85 rotates, the regulating wheel starts to move inwardly to restrict the grinding throat and engage a work piece. This movement is relatively slow because of the check valve 82 or other suitable restricting means and, as the slide nears the end of its movement, its speed is still further slowed up by the action of the valve slide. The cam 85 is preferably so shaped that the port 81, or other similarly acting means which may be employed, comes into action shortly before the stop screw 104 strikes the abutment 105, effecting a very gradual movement of the regulating wheel at the inner end of its stroke and as it comes into engagement with the work. Thereafter, the stop screw 104 engages the abutment 105 and thereupon the fluid pressure holds the regulating wheel slide firmly in the position determined by the stop screw 104 until the grinding operation is completed. Thereupon, the cam 85 quickly moves the valve slide to reverse the valves and withdraw the regulating wheel.

When the stop screw 104 is against the abutment 105, the operative surfaces of the two wheels 20 and 16 are a predetermined distance apart and the work is ground to an accurate diameter measured by this predetermined distance. As the grinding of the work is being completed the fluid pressure supports the regulating wheel with a firm backing. The relief valve 50 (Figure 8) prevents the pressure in the feed line from building up beyond a predetermined value and hence prevents damage from excessive pressure. The relief valve is so adjusted that the pressure which is permitted to build up in back of the piston 25 is ample to insure dependable backing of the regulating wheel.

When the machine is being used to grind work which is cylindrical throughout and which is thus capable of being fed completely through the grinding throat, it is desirable that the regulating wheel carriage 11 be capable of adjustment toward and away from the grinding wheel, and capable of being fixed in the position to which it is adjusted. As shown in Figures 1 and 2, the left-hand end of the hub 26 of the piston 25 is exteriorly threaded and threaded thereon is a nut 107. In the drawings, the nut is shown threaded to the left and resting loosely upon the piston hub. By moving the piston 25 to the left-hand end of the cylinder 24 and threading the nut 107 firmly up against the cylinder wall 27, the piston 25 is locked in position against sliding movement. When the piston 25 is thus locked against movement, the piston becomes a stationary feed nut. By now turning the hand wheel 36 the carriage 11 may be adjusted in position toward and away from the grinding wheel and entirely independently of the hydraulic reciprocating means. Of course, when the piston is thus locked and the hydraulic reciprocation of the regulating wheel is not being employed, the valve 52 or the valve 56 (Figure 8) is closed to cut off the fluid pressure. No harm can result from leaving these valves open, however, as the relief valve 50 prevents the building up of any excessive pressure. Thus, in a very simple manner, the automatic drive of the slide 11 is rendered ineffective and yet the parts thereof are still an integral and important element in the operation and adjustment of the machine.

It is often desirable, when the automatic reciprocation of the regulating wheel is being employed, to hold the regulating wheel at its inner position against the abutment 105 and in engagement with the work for a longer period than the cam 51 is designed to permit, or to pass through the grinding throat work pieces which are cylindrical throughout, without making any changes in the adjustments of the machine. Referring to Figure 9, the slide 97 operating within the valve passage 65a is manually slidable by means of a rod 108 which projects outwardly through a packing 109 toward the front of the machine. As the parts are positioned in the drawings, the feed pipe 61 is in communication with the right-hand side of the part 96 by way of the passages 102 and 101, the port 100 and the passage 99, and the fluid pressure is operative upon the slide 71 to urge the slide to the left. If the slide 97 is now moved to the left by actuation through the rod 108, an undercut portion 110 comes into registry with the passage 99 and with an exhaust port 111 which leads to the exhaust pipe 62, as may be seen in Figure 11; a port 112 in the slide 97 and communicating with the passage 101 comes into registry with the passage 98. Thus, the right-hand side of the part 96 is connected with exhaust and the left-hand side thereof is connected with the fluid pressure. This results in an immediate movement of the valve slide 71 to the right, connecting the pipe 43 with exhaust and connecting the pipe 44 with the fluid pressure admitted thereto through the port 81. As long as the slide 97 is held in, or to the left, as viewed in Figure 9, the fluid pressure thus acts upon the left-hand side of the piston 25 (Figure 1) to hold the regulating wheel in against its stop. The fluid pressure acting upon the left-hand side of the part 96 (Figure 9) holds the slide 71 to the right so that the rotating cam 85 is rendered ineffective. When the slide 97 is again moved back to the position shown in the drawings (Figure 9) the right-hand side of the part 96 is again exposed to the fluid pressure and the left-hand side thereof is connected with exhaust by the under-cut portion 113 registering with the passage 98 and with an exhaust passage 114 which communicates with the exhaust pipe 62, as shown in Figure 11.

The casting 63 containing the valve slide 71 and the slide 97 is seen at the left-hand side of Figure 1. It is mounted preferably upon the left-hand end of the frame 10 with the slides 71 and 97 extending in a horizontal direction transversely of the machine. The passage 64 is above the passage 65 and the exhaust pipe 62 connects with an exhaust passage 62a which is formed in a laterally projecting portion 63a of the valve casting and with which the exhaust passages 67, 114 and 111 communicate (Figure 11).

Figure 3:
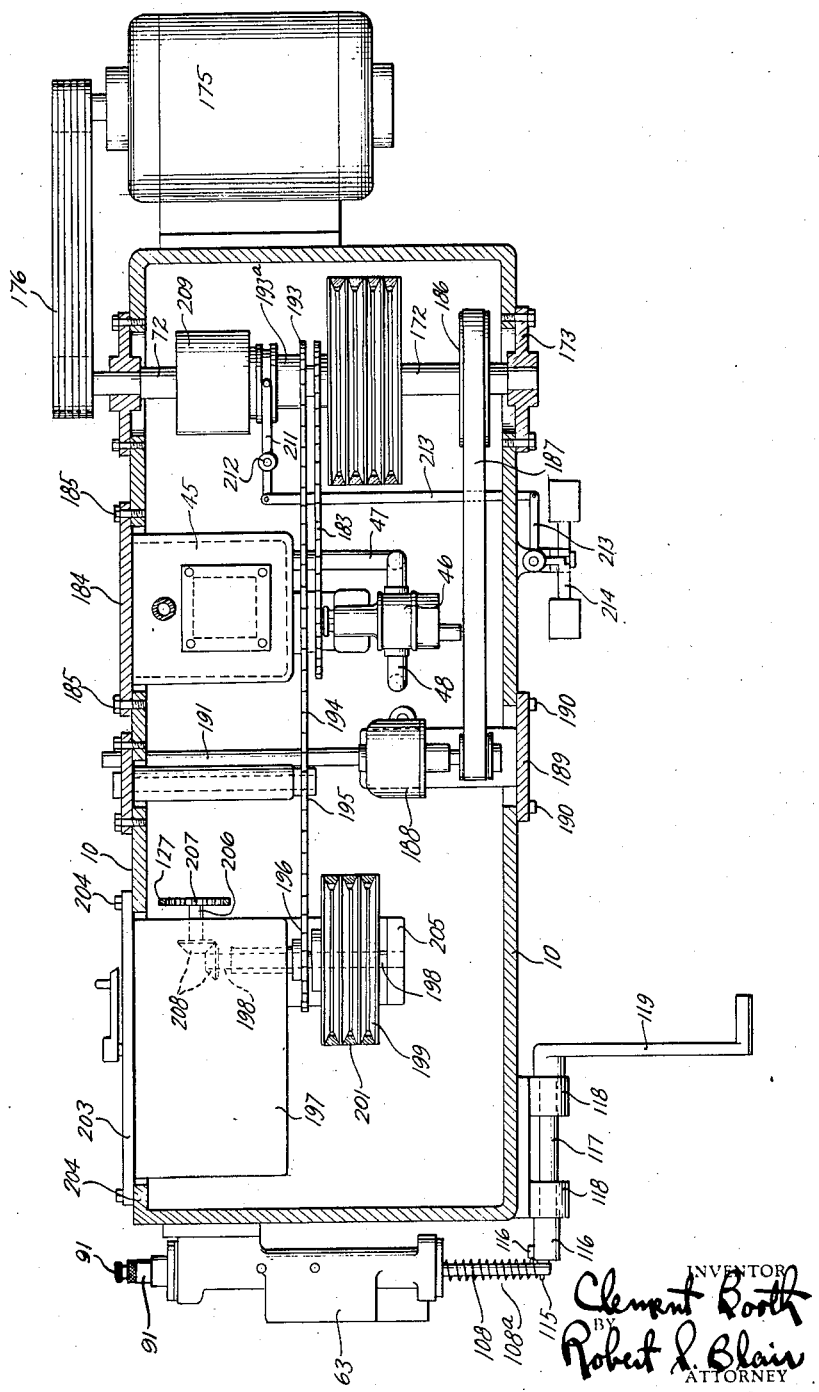
Figure 3 is a view taken substantially as indicated by the section line 3—3 of Figure 1.

As shown in Figures 3 and 12, the rod 108 to the slide 97 extends outwardly toward the front of the machine and at its outer end is connected at 115 with an upwardly projecting arm 116 which is secured to a horizontal rod 117. The rod 117 is rotatably mounted in a pair of lugs 118 on the front surface of the frame 10, and at its end opposite to the arm 116 has fixed thereto an outwardly projecting lever or handle 119. By depressing the lever 119 the rod 108 is forced inwardly or rearwardly of the machine to place the left-hand side of the part 96 (Figure 9) in communication with the fluid supply. Thus, by manually depressing the lever 119, the cam 85 is rendered inoperative and the regulating wheel is held against its stop and in its position to restrict the grinding throat. This condition prevails until the lever 119 is again raised, and it is accomplished without changing the adjustments of the machine in any way.

As shown in Figure 12, the rod 108 is preferably held in its normal position to the right by means of a spring 108a. Thus the automatic reciprocating of the regulating wheel may be temporarily suspended by manually depressing the handle 119, and immediately the handle is released, the reciprocating mechanism is again rendered operative.

Referring now to Figure 2, the shaft 86, upon which the valve actuating cam 85 is mounted, is seen extending longitudinally of the rear of the machine and exterior of the frame 10. This shaft is preferably composed of three sections 86a, 86b and 86c. The sections 86a and 86b are joined together by a pair of end flanges secured respectively to the shaft sections and clamped face to face by bolts 121 passing through arcuate slots therein. By loosening the bolts 121 and turning the flanges 120 relative to each other, the angular relation between the shaft section 86a and the shaft sections 86b and 86c may be adjusted. The shaft sections 86b and 86c are joined together in a similar manner by end flanges 122 and clamping bolts 123. The shaft is rotatably supported by brackets 124 and 125 secured to the rear side of the frame 10, and by a bracket 126 secured to the grinding wheel slide 12, and it is driven, in the direction indicated, by a chain 127 passing over a sprocket 128 on the shaft. The chain is driven from mechanism contained within the hollow frame 10, as will be described hereinafter.

Still referring to Figure 2, there is shown a rod 129 which is slidably supported in a horizontal plane just above the surface of the work support 21 and for sliding movement forwardly toward the grinding throat. This sliding arm 129 is for the purpose of removing the work from the grinding throat after the grinding operation has been completed, the removal being accomplished in this instance by kicking the work out forwardly.

Figure 5:
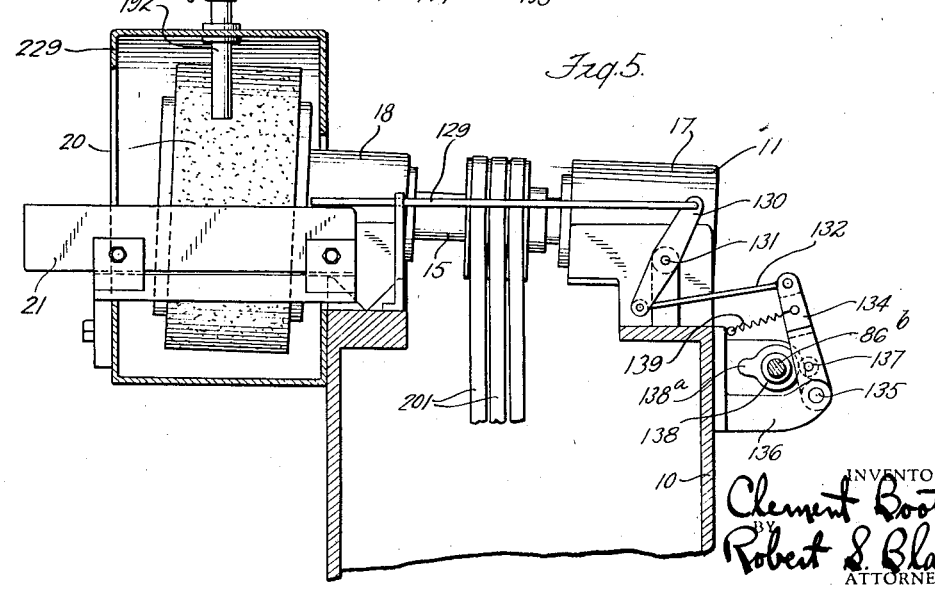
Figure 5 is a section taken as indicated by the line 5—5 of Figure 2.

Referring now to Figure 5, the sliding rod 129, which may be called an ejector rod, is connected at its rear end to one end of a lever arm 130 which is pivoted upon the frame at 131 and has connected thereto on the other side of its pivot a rod 132. The rod 132 is connected at 133 to the upper end of a forked arm 134 which is pivoted at its lower end at 135 in brackets 136 extending outwardly from the frame 10. The arm 134 is positioned rearwardly of and adjacent to the shaft portion 86b, and between the two forked arms thereof it carries a roller 137. Fixed upon the shaft section 86b is a cam 138 having a projection 138a which is adapted to strike the roller 137 and swing the arm 134 outwardly about its pivot 135 each time the shaft makes a rotation.

Suitable spring means, such as 139, holds the roller 137 against the surface of the cam.

Each time the cam portion 138a passes over the roller 137, the ejector rod 129 is quickly moved forwardly to eject a piece of work from the grinding throat and back again to the position shown in the drawings. The ejector is adapted to operate each time the regulating wheel 20 moves back to enlarge the grinding throat. The reciprocations of the regulating wheel are controlled by the rotation of the shaft 86 and the operation of the ejector is also controlled by this same rotating shaft. The shaft 86 thus constitutes a rotating timing means which determines the relation between the movements of the regulating wheel slide and the operation of the ejector. By loosening the bolts 121 (Figure 2) and by making the angular adjustment permitted thereby between the shaft portions 86a and 86b, the timing of the regulating wheel movements and of the ejector operation may be properly adjusted with the greatest convenience.

Figure 6:
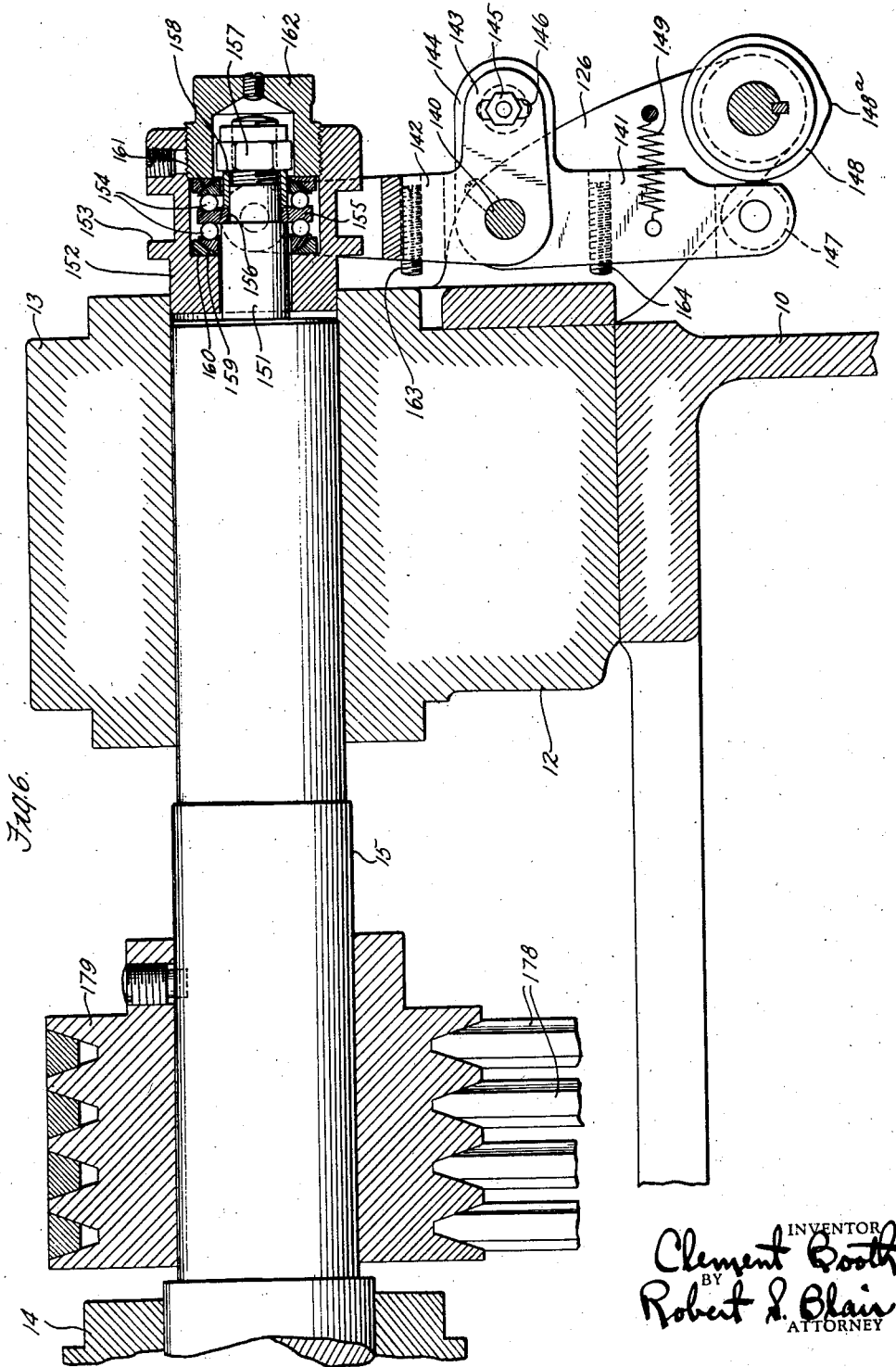
Figure 6 is a section taken as indicated by the line 6—6 of Figure 2.
Figure 7:
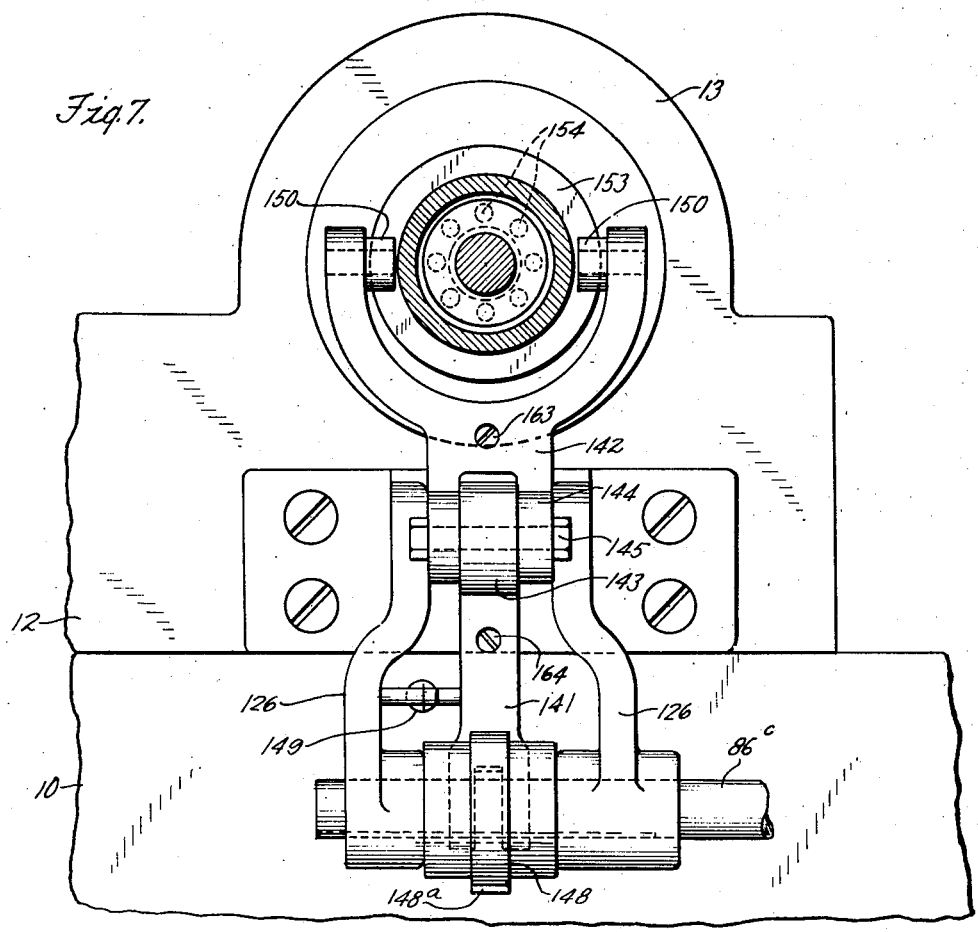
Figure 7 is an end view of the parts illustrated in Figure 6.

The shaft portion 86c (Figure 2) terminates adjacent to the rear end of the grinding wheel spindle 15. Referring now to Figure 7, the supporting bracket 126 in which the end of the shaft portion 86c is rotatably supported, is seen to comprise two arms extending downwardly from the grinding wheel slide 12. Extending between these two arms, above the shaft bearings therein, is a pin 140 (Figure 6) by means of which is pivotally supported a lever comprising two parts, a part 141 projecting downwardly and a part 142 projecting upwardly. These two parts 141 and 142 are provided respectively with rearwardly projecting lugs 143 and 144 and they are adjustably clamped together by a bolt 145 passing through these lugs and through an elongated slot 146 in one or both of the lugs.

The lower end of the member 141 is positioned adjacent to the shaft 86c and between the same and the frame 10, and it carries a roller 147. This roller is adapted to engage the surface of a cam 148 which is keyed upon the shaft 86c between the two bearings portions of the supporting bracket 126. The bracket 126 and the cam 148 therewith slide longitudinally along the shaft 86c as the grinding wheel slide is adjusted in position by means of the feed screw 22 (Figure 2). A spring 149 normally urges the roller into engagement with the cam.

As shown in Figure 7, the upper lever portion 142 forks upwardly about the axis of rotation of the grinding wheel spindle 15 and carries a pair of inwardly projecting members 150. Referring again to Figure 6, the grinding wheel spindle 15 has projecting rearwardly therefrom, and from the rear end of the bearing 13, a reduced portion 151. Surrounding this reduced portion of the spindle is a sleeve 152 which has in its surface a circumferential groove 153. The members 150 rest in this groove 153 and thus it will be seen that swinging of the part 142 about its pivot 140 will tend to move the sleeve 152 in a direction axially of the grinding wheel spindle 15.

Enclosed within the sleeve 152 is a double ball bearing 154, the middle race 155 of which is secured upon the spindle portion 151 against a shoulder 156. The race 155 is held firmly against the shoulder 156 by a nut 157 threaded upon the end of the spindle and acting through a sleeve 158. The outer race 159 rests against a shoulder 160 on the interior of the sleeve 152 and the other outer race 161 is urged inwardly by a plug 162 threaded into the end of the sleeve 152. It will be seen that when the plug 162 is threaded into place, the two outer races 159 and 161 are urged against the ball bearings which, in effect, clamp the inner race 158 under the urge of the plug 162.

The construction just described constitutes a very dependable thrust bearing for transmitting thrust axially of the grinding wheel spindle between the sleeve 152 and the grinding wheel spindle. Any wear may be taken up with the greatest convenience by simply threading in the plug 162, and the construction may be kept so adjusted that there is no play between the sleeve and the spindle. The parts 150 which engage with the groove 153 are preferably hardened rollers which fit accurately in the groove so that no play develops at these points.

The construction just described is adapted to give to the grinding wheel an axially reciprocating movement in its bearings as the grinding wheel rotates and grinds the work. The cam 148 fixed upon the rotating shaft 86 has on its surface one or more projections 148a adapted to strike the roller 147 and move the lever portion 141 inwardly about the pivot 140 against the action of the spring 149. The lever portion 141 is rigidly secured to the lever portion 142 by the clamping bolt 145 and hence swinging of the part 141 by the cam swings the part 142 to reciprocate the grinding wheel spindle. This slight reciprocation of the grinding wheel erases from the work any marks which the grinding wheel might leave thereon resulting from the truing lines in the operative surface of the wheel.

If it be desired not to use this reciprocation of the grinding wheel, the clamping bolt 145 is loosened and the lever 141 is swung inwardly about the pivot 140 relative to the lever portion 142 until the roller 147 is out of engagement with the cam, whereupon the lever portions are again clamped together by the bolt 145. In the lever portion 142 is an inwardly extending set screw 163 and in the lever portion 141 is a similar set screw 164. These set screws are now threaded inwardly and firmly against the rear surface of the slide 12 or portions secured to the slide and against which they strike. In this manner, the actuating means for reciprocating the grinding wheel is disconnected and the grinding wheel spindle is firmly locked against axial movement. It will be seen that this construction is compact and efficient. The drive of the grinding wheel reciprocation is taken from the shaft 86 which is the same shaft that controls the reciprocating movements of the regulating wheel slide and the actuation of the ejector.

Turning again to Figure 1, as was mentioned earlier herein, the grinding wheel slide 12 may be adjusted in position toward and away from the work support 21 by means of the feed screw operated by the hand wheel 22, to adjust the grinding throat for different sizes of work or to take up wear on the wheel. For accurate grinding, it is important that the grinding wheel when once adjusted in position shall be fixed and immovable under the pressure of the work thereon. As shown in Figure 1, there is secured to the bottom side of the grinding wheel slide 12 a depending fixture 165 having a longitudinal and laterally extending flange 166. Rotatably mounted in a lug 167 on the frame is a spindle 168 having exterior of the frame a lever or handle 169 by means of which it may be rotated manually. An upwardly projecting arm 170 is eccentrically and rotatably mounted upon the inner end of the spindle 168 and has at its upper end a lip 171 which overhangs the flange 166 of the fixture 165. By rotating the spindle 168 by means of the handle 169 the lip 171 is pulled down firmly against the upper surface of the flange 166 by the eccentric. In this manner the grinding wheel slide is dependably locked in the position to which it is adjusted. The flange is of such length that it is positioned beneath the lip 171 throughout the range of movement of the grinding wheel slide.

Figure 4:
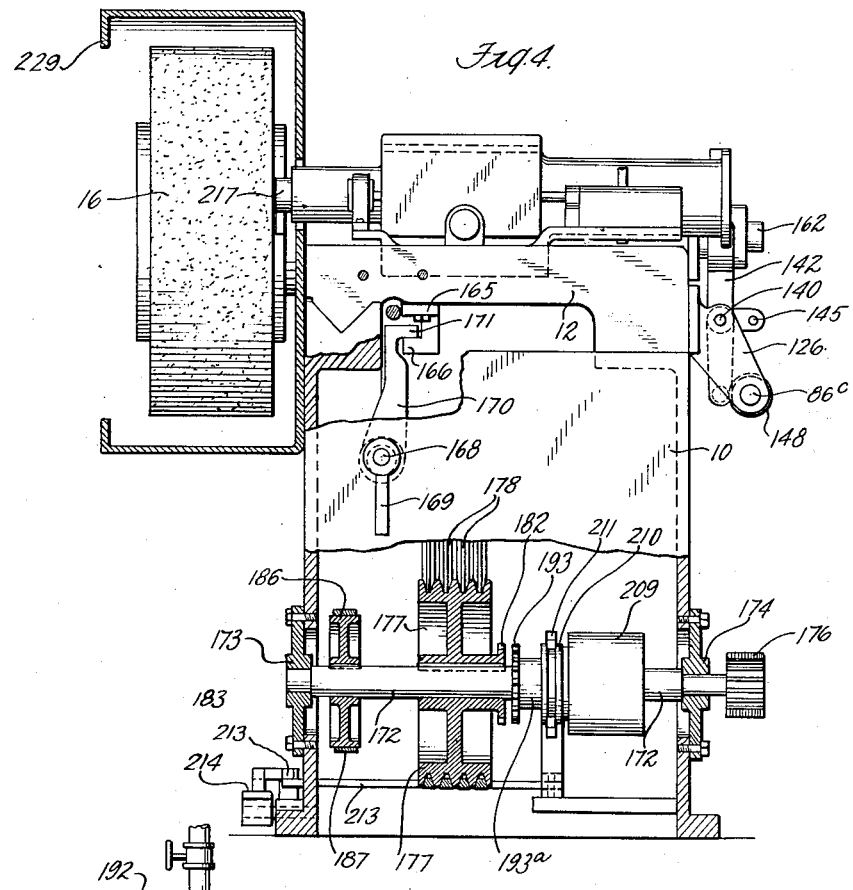
Figure 4 is an end view viewed from the right of Figure 1, and with portions broken away.

Considering now the drive of this machine, reference is had to Figures 1, 3 and 4. The shaft 172 is the main driving shaft and extends transversely of the frame 10, being mounted in the lower right-hand portion of the frame and supported in suitable bearings 173 and 174. This shaft is driven by any suitable means, for example, by an electric motor 175 mounted upon the outer side of the right-hand end of the frame and connected to drive the machine by a flat chain 176 (Figure 3). Fixed upon the shaft 172 is a pulley 177 from which the grinding wheel is directly driven. This drive preferably takes the form of a plurality of parallel rope-like belts 178 passing over the pulley 177 and over the pulley 179 on the grinding wheel spindle. The sides of the driving belts are tapered and coact with tapered grooves in the pulley surfaces. A suitable idler pulley may be provided for maintaining the tension in the belt. This tensioning means may take the form shown in Figure 1 of a pulley 180 mounted in the end of a pivoted arm 181 and urged against the belt by spring pressure. This form of drive is particularly advantageous in a grinding machine, since the rope-like belt 178 will transmit a very heavy driving force without slipping. Even when the grinding wheel 16 is taking the deepest cuts there is no danger of belt slippage.

Mounted upon the shaft 172 adjacent to the pulley 177 is a sprocket 182 over which passes a chain 183 for driving the oil pump 46. The oil pump 46 and the supply tank 45 are mounted within the hollow frame 10, as shown in Figures 1 and 3. Preferably the oil pump is mounted upon the side of the oil tank 45 and the oil tank is mounted upon a plate 184 covering an opening in the rear side of the frame and secured in place by bolts 185. The oil tank and pump may thus be mounted in place as a unit by being inserted through the opening in the frame.

Fixed upon the main shaft 172 adjacent the front end thereof is a pulley 186 over which passes a belt 187 driving a pump 188 for cooling fluid. The pump 188 is preferably mounted upon a plate 189 which covers an opening in the front of the frame, as shown in Figure 3, and which is secured in place by bolts 190. The cooling fluid pump 188 may thus be inserted or removed as a unit with the plate 189. The intake to the pump 188 is indicated at 191, passing to the pump from the rear of the machine. The pump 188 draws cooling fluid from a suitable tank positioned at the rear of the machine and delivers this fluid through suitable piping into the region of contact between the work and the wheels and also to the operative region of the truing tools upon the wheels. A pipe for discharging the cooling fluid upon the surface of the regulating wheel is shown at 192 in Figure 5.

Driven by a sprocket 193 about the main driving shaft 172 is a chain 194 which passes over an idler sprocket 195 and drives a sprocket 196. The sprocket 196 is mounted upon a hollow shaft extending into a box 197 which is located adjacent the left-hand end of the machine and at the rear. This box 197 contains adjustable speed change gearing preferably of the sliding gear type. Through this gearing within the box 197 the hollow shaft upon which the sprocket 196 is mounted drives a shaft 198 upon which is fixed a pulley 199 from which the regulating wheel 20 is driven. The drive from the pulley 199 to the pulley 200 upon the regulating wheel spindle 19 is preferably by means of rope-like belts 201 similar to the drive employed for driving the grinding wheel 16. As shown in Figure 1, the belts 201 pass over a suitable tensioning idler pulley 202 similar to the idler 180 for the grinding wheel belts. By means of this drive a constant and uniform rotation of the regulating wheel is assured without danger of the serious inaccuracies which may result from belt slippage and consequent irregular and non-uniform rotation of the regulating wheel.

The speed change gearing contained within the gear box 197 is not shown herein, but it may be of any known type for providing suitable gear ratios to give an appropriate range of driving speeds for the regulating wheel 20. The speed change gearing may be, for example, like that shown in the patent to Einstein et al No. 1,524,969. It is desirable that the regulating wheel be capable of drive at high speed for truing purposes and be provided with a suitable range of speeds for regulating action upon the work. Preferably the rear face of the gear box 197 comprises a plate 203 which closes an opening in the rear of the hollow frame 10, and is secured thereto by bolts 204. The shaft 198 carrying the regulating wheel driving pulley 199 is preferably supported at its outer end in a bracket 205 projecting from the gear box. Thus, the gear box with the driving pulley 199 may be assembled and inserted into place as a unit.

In Figure 3 there is shown projecting from the side of the gear box 197 a shaft 206 upon which is fixed a sprocket 207. This sprocket 207 drives the chain 127 which drives the cam shaft 86, as was mentioned above, the chain 127 extending upwardly and outwardly through an opening in the frame to the sprocket 128 on the cam shaft. The sprocket 207 is driven through the speed change mechanism within the gear box, for example, being driven from the shaft 198 by the bevel gear connection shown in dotted lines at 208 in Figure 3. Thus, the speed of rotation of the cam shaft 86 may be varied by shifting the speed change gearing, and in this manner the speed of rotation of the cam shaft may be adjusted to give the desired speed of reciprocating movement to the regulating wheel slide and also to determine the frequency of operation of the ejector mechanism. This cam shaft 86 constitutes an adjustable timing means for controlling the reciprocations of the regulating wheel slide, the actuation of the ejector and the axial reciprocations of the grinding wheel.

Referring to Figures 3 and 4, the sprocket 193 which drives the speed change gearing from the main driving shaft 172 is preferably not mounted directly upon the shaft 172. It is mounted upon a sleeve 193a which is connected in driving relation with the shaft 172 by a clutch 209 which may be of any suitable construction and is therefore not shown in detail herein. The movable member 210 of the clutch is engaged by a forked shifting arm 211 which is pivoted at 212 (Figure 3). This shifting arm 211 is connected by a suitable linkage 213 with a foot pedal 214 which is positioned at the front of the machine within convenient reach of an operator. By operating the foot pedal 214 the sprocket 193 may be connected in driving relation with the shaft 172 or disconnected therefrom. Thus, the drive of the speed change gearing and of the regulating wheel may be interrupted conveniently without interrupting the drive of the grinding wheel or the drive of the oil pump or the drive of the cooling fluid pump. This is of distinct advantage when it is desired to change the speed of the regulating wheel or the speed of the cam shaft 86 by shifting the speed change gears. The clutch 209 is thrown out to interrupt the drive of the speed change gearing while the gears are being changed and without interrupting the drive of the heavy and rapidly rotating grinding wheel.

The machine is equipped with truing devices for truing the operative surfaces of the grinding wheel 16 and of the regulating wheel 20. In Figure 2 there is shown a truing tool 215 for the grinding wheel and a truing tool 216 for the regulating wheel. These tools, which are preferably diamond points, are mounted upon the respective slides 217 and 218 for movement across the operative surfaces of the wheels. These slides are preferably operated by fluid pressure and the fluid circuits therefor are shown in the diagrammatic view of Figure 8. Referring to Figure 8, a cylinder 219 carries a piston for operating the truing tool for the regulating wheel, and a cylinder 220 carries a piston for operating the truing tool of the grinding wheel. The feed pipe 54 leads through a valve mechanism 221 to the cylinder 219 and a discharge pipe 222 leads from this valve mechanism back to discharge in the tank 45. The feed pipe 55 leads through a valve mechanism 223 to the cylinder 220, and a discharge pipe 224 leads therefrom back to the supply tank. The mounting and driving apparatus for the truing tools is not shown in detail herein. Preferably, this mechanism is the same as that shown and described in my co-pending application Serial No. 115,220, filed June 11, 1926.

When the wheels are being trued, and particularly the regulating wheel, it is important that the path of travel of the truing tool across the wheel surface be properly related to the line of contact between the wheel and the work. For example, when the axis of the regulating wheel is inclined with respect to the path of movement of the work to give a feeding component, and cylindrical work is being operated upon, the chief function of the truing is to dress the wheel surfaces so that they present to each other two precisely parallel lines along which the work is to contact with the wheels. It is advantageous in many cases to "grind above centers". In a machine in which the wheels are arranged as they are in the embodiment shown in the drawings, for best results in grinding cylindrical work the lines of contact between the work and the wheels should be above the center line of the two wheels. Referring to Figure 13, such an arrangement is shown, and the truing tool 216 is shown mounted to operate upon the surface of the regulating wheel 20 on the side of the wheel opposite to the work. This, of course, is of advantage over passing a truing tool between the wheels, since it is not necessary to interfere with the setting of the work support or other adjustments in order to true the wheels. As shown in Figure 13, the truing tool 216 is positioned at the same height above the center line 225 as is the line of contact 226 of the wheel with the work. In order that the wheel may be dressed accurately, it is important that this vertical adjustment of the truing tool be accomplished accurately.

The truing tool 216 is mounted in a bracket 227 which is vertically adjustable in the slide 218 and which may be locked in the positon to which it is adjusted by means of a set screw 228. Secured to the guard 229 about the wheels is a bracket 230 having an outwardly projecting arm 231 which provides at its outer end an elongated bearing 232 in which is supported a rod 233. This rod 233 is squared except for the portion 233a thereof which is supported in the bearing 232. A set screw 234 is provided for fixing the position of the rod 233 in its bearing. Slidably mounted upon the squared rod 233 is a bracket 235 having a depending portion 236 in which is slidably supported a pin 237. The left-hand end of the rod 233 extends in front of the surface of the truing tool supporting bracket 227.

The bracket 230 is vertically adjustable upon the guard 229. Preferably, its under-surface is grooved and mates with a guiding projection 238 on the guard, and it may be locked in the vertical position to which it is adjusted by means of a clamping bolt 239 passing through a vertical slot 240 therein. The use of this construction is as follows: A work piece such as 241 of the size to be ground is placed in the grinding throat and in engagement with the wheel surfaces. The point 237 is then slid inwardly, the bracket 236 is slid along the squared rod 233 and the bracket 230 is adjusted vertically until the point 237a of the pointer coincides with the point 226 which marks the line of contact between the regulating wheel and the work. The rod 233 is parallel to the center line 225. The vertical distance between the center of the pointer 237 and the rod 233, for example, the lower edge of the rod, is a fixed distance. The truing tool supporting bracket 227 is now adjusted vertically in the slide 218, by loosening the set screw 228, until the vertical distance between the truing point and the lower edge of the bar or rod 233 is exactly equal to the fixed distance between the center of the pointer 237 and the lower edge of the rod. This fixed distance is indicated by appropriate markings upon the surface of the bracket 227 in order to facilitate this adjustment. In this manner, the proper vertical adjustment of the truing tool is made with the greatest convenience.

From the foregoing, it will be seen that there is herein provided a machine which achieves the objects of this invention, including many practical advantages. The machine is adapted for grinding substantially all work of round cross-section with rapidity and precision. The parts are compactly arranged for convenient accessibility and the machine is convenient to operate and thoroughly practical throughout.

As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim as my invention:

1. In a grinding machine, in combination, a grinding throat adapted for simultaneous grinding and rotating action upon work of round section comprising three means, one of which means is in the form of a grinding wheel adapted to be rotated at a relatively high speed, another of which means is in the form of a regulating wheel adapted to be rotated at a relatively low speed and in a direction to present an operative surface traveling in a direction opposite from that of the adjacent surface of said grinding wheel, and the third of which means includes a member for holding work of round section in operative relation to said two wheels, means driven by fluid pressure for moving one of said means to enlarge and restrict said grinding throat, and a valve mechanism for controlling the flow of fluid to said last means, said valve mechanism including means for decelerating the movement of said fluid driven means during movement thereof to restrict said grinding throat.

2. In a grinding machine, in combination, a grinding throat adapted for simultaneous grinding and rotating action upon work of round section comprising three means, one of which means is in the form of a grinding wheel adapted to be rotated at a relatively high speed, another of which means is in the form of a regulating wheel adapted to be rotated at a relatively low speed and in a direction to present an operative surface traveling in a direction opposite from that of the adjacent surface of said grinding wheel, and the third of which means includes a member for holding work of round section in operative relation to said two wheels, means driven by fluid pressure for moving one of said means to enlarge and restrict said grinding throat, and means for controlling the flow of fluid to said last means to give said last means a reciprocating movement, said controlling means including means adapted to cause relatively fast movement of said fluid operated means as said grinding throat is enlarged and relatively slow movement thereof as said grinding throat is restricted.

3. In a grinding machine, in combination, a grinding throat adapted for simultaneous grinding and rotating action upon work of round section comprising three means, one of which means is in the form of a grinding wheel adapted to be rotated at a relatively high speed, another of which means is in the form of a regulating wheel adapted to be rotated at a relatively low speed and in a direction to present an operative surface traveling in a direction opposite from that of the adjacent surface of said grinding wheel, and the third of which means includes a member for holding work of round section in operative relation to said two wheels, means driven by fluid pressure for moving one of said means to enlarge and restrict said grinding throat, and means for controlling the flow of fluid to said last means to give said last means a reciprocating movement, said controlling means including means adapted to cause relatively fast movement of said fluid operated means as said grinding throat is enlarged and relatively slow movement thereof as said grinding throat is restricted and being constructed also to cause deceleration of the movement thereof during the latter portion of its movement to restrict said grinding throat.

4. In a grinding machine, in combination, a grinding throat adapted for simultaneous grinding and rotating action upon work of round section comprising three means, one of which means is in the form of a grinding wheel adapted to be rotated at a relatively high speed, another of which means is in the form of a regulating wheel adapted to be rotated at a relatively low speed and in a direction to present an operative surface traveling in a direction opposite from that of the adjacent surface of said grinding wheel, and the third of which means includes a member for holding work of round section in operative relation to said two wheels, means driven by fluid pressure for moving one of said means to enlarge and restrict said grinding throat, a stop for limiting the movement of said one means to restrict said grinding throat, and a valve mechanism for controlling the flow of fluid to said fluid driven means, said valve mechanism including means adapted to decrease the speed of movement of said fluid driven means as said grinding throat is restricted and as said stop is approached.

5. In a grinding machine, in combination, a grinding throat adapted for simultaneous grinding and rotating action upon work of round section comprising three means, one of which means is in the form of a grinding wheel adapted to be rotated at a relatively high speed, another of which means is in the form of a regulating wheel adapted to be rotated at a relatively low speed and in a direction to present an operative surface traveling in a direction opposite from that of the adjacent surface of said grinding wheel, and the third of which means includes a member for holding work of round section in operative relation to said two wheels, driven means for moving one of said means to enlarge and restrict said grinding throat, a rotating timing means, means controlled by said timing means for controlling said driven means and adapted to give said driven means a movement to alternately restrict and enlarge said grinding throat, and means controlled by said timing means adapted to remove work from said grinding throat each time said grinding throat is enlarged.

6. In a grinding machine, in combination, a grinding throat adapted for simultaneous grinding and rotating action upon work of round section comprising three means, one of which means is in the form of a grinding wheel adapted to be rotated at a relatively high speed, another of which means is in the form of a regulating wheel adapted to be rotated at a relatively low speed and in a direction to present an operative surface traveling in a direction opposite from that of the adjacent surface of said grinding wheel, and the third of which means includes a member for holding work of round section in operative relation to said two wheels, means driven by fluid pressure for moving one of said means to enlarge and restrict said grinding throat, a rotating timing means, a valve mechanism for controlling the flow of fluid to said fluid operated means, means controlled by said timing means adapted to actuate said valve mechanism to give said fluid driven means a movement to alternately restrict and enlarge said grinding throat, and means controlled by said timing means adapted to remove work from said grinding throat each time said grinding throat is enlarged.

7. In a grinding machine, in combination, a grinding throat adapted for simultaneous grinding and rotating action upon work of round section comprising three means, one of which means is in the form of a grinding wheel adapted to be rotated at a relatively high speed, another of which means is in the form of a regulating wheel adapted to be rotated at a relatively low speed and in a direction to present an operative surface traveling in a direction opposite from that of the adjacent surface of said grinding wheel, and the third of which means includes a member for holding work of round section in operative relation to said two wheels, means driven by fluid pressure for moving one of said means to enlarge and restrict said grinding throat, a rotating cam shaft, a valve mechanism for controlling the flow of fluid to said fluid operated means, means operated by said cam shaft adapted to actuate said valve mechanism to give said fluid driven means a movement to alternately restrict and enlarge said grinding throat, and means actuated by said cam shaft adapted to remove work from said grinding throat each time said grinding throat is enlarged.

8. In a grinding machine, in combination, work supporting means, a wheel, means mounting said wheel to engage work upon said supporting means, means operated by fluid pressure for moving one of said first two means relative to the other to position said wheel and said work into and out of operative engagement, and a valve mechanism for controlling the flow of fluid to said fluid operated means to give said fluid operated means a reciprocating movement, said valve mechanism including means for decreasing the speed of movement of said fluid operated means as the position of operative engagement of said wheel and said work is approached.

9. In a grinding machine, in combination, work supporting means, a wheel, means mounting said wheel to engage work upon said supporting means, means operated by fluid pressure for moving one of said first two means relative to the other to position said wheel and said work into and out of operative engagement, a stop for limiting the movement of said one means toward said position of operative engagement, and a valve mechanism for controlling the flow of fluid to said fluid operated means, said valve mechanism including means adapted to decelerate the movement of said one means as said stop is approached.

10. In a grinding machine, in combination, work supporting means, a wheel adapted to engage work upon said supporting means, a slide adapted to be moved to change the relation between said wheel and said work, a piston connected to move said slide, a source of fluid under pressure, a path for leading fluid from said fluid source to and from one side of said piston, and means interposed in said path for permitting a more rapid flow of fluid therethrough in a direction away from said piston than in a direction toward said piston, said means comprising a valve seat and a valve member movable into position against said seat and into a position away from said seat and when in the latter position to substantially unrestrict the flow of fluid through said path, said valve member having therethrough a restricted opening through which a less quantity of fluid flows in reversed direction when said valve member is seated upon said seat.

11. In a grinding machine, in combination, work supporting means, a wheel adapted to engage work upon said supporting means, a slide adapted to be moved to change the relation between said wheel and said work, a double acting piston connected to move said slide, a source of fluid under pressure, and a valve mechanism for controlling the flow of said fluid to and from said piston, said valve mechanism comprising a sliding member adapted upon sliding in one direction to connect one side of said piston with said source of fluid under pressure and the other side thereof with exhaust and adapted upon sliding in the opposite direction to connect said one side of said piston with exhaust and said other side of said piston with said source of fluid under pressure, and said valve mechanism having means adapted as said member slides in one direction to admit said fluid to said piston successively through a plurality of different sized ports to vary the speed of movement of said piston.

12. In a grinding machine, in combination, work supporting means, a wheel adapted to engage work upon said supporting means, a slide adapted to be moved to change the relation between said wheel and said work, a double acting piston connected to move said slide, a source of fluid under pressure, and a valve mechanism for controlling the flow of said fluid to and from said piston, said valve mechanism comprising a sliding member adapted upon sliding in one direction to connect one side of said piston with said source of fluid under pressure and the other side thereof with exhaust and adapted upon sliding in the opposite direction to connect said one side of said piston with exhaust and said other side of said piston with said source of fluid under pressure, said valve mechanism having means adapted as said member slides in one direction to admit said fluid to said piston successively through a plurality of different sized ports to vary the speed of movement of said piston, and driven means for reciprocating said sliding valve member.

13. In a grinding machine, in combination, work supporting means, a wheel adapted to engage work upon said supporting means, a slide adapted to be moved to change the relation between said wheel and said work, a double acting piston connected to move said slide, a source of fluid under pressure, and a valve mechanism for controlling the flow of said fluid to and from said piston, said valve mechanism comprising a sliding member adapted upon sliding in one direction to connect one side of said piston with said source of fluid under pressure and the other side thereof with exhaust and adapted upon sliding in the opposite direction to connect said one side of said piston with exhaust and said other side of said piston with said source of fluid under pressure, said valve mechanism having means adapted as said member slides in one direction to admit said fluid to said piston successively through a plurality of different sized ports to vary the speed of movement of said piston, and means for determining at will the rate of reciprocation of said piston.

14. In a grinding machine, in combination, work supporting means, a wheel adapted to engage work upon said supporting means, a slide adapted to be moved to change the relation between said wheel and said work, a double acting piston connected to move said slide, a source of fluid under pressure, and a valve mechanism for controlling the flow of said fluid to and from said piston, said valve mechanism comprising a sliding member adapted upon sliding in one direction to connect one side of said piston with said source of fluid under pressure and the other side thereof with exhaust and adapted upon sliding in the opposite direction to connect said one side of said piston with exhaust and said other side of said piston with said source of fluid under pressure, said valve mechanism having means adapted as said member slides in one direction to admit said fluid to said piston successively through a plurality of different sized ports to vary the speed of movement of said piston, and a rotating cam for reciprocating said sliding valve member, said cam being shaped to give said member a slower movement in said one direction than in the opposite direction.

15. In a grinding machine, in combination, work supporting means, a wheel adapted to engage work upon said supporting means, a slide adapted to be moved to change the relation between said wheel and said work, a double acting piston connected to move said slide, a source of fluid under pressure, and a valve mechanism for controlling the flow of said fluid to and from said piston, said valve mechanism comprising a sliding member adapted upon sliding in one direction to connect one side of said piston with said source of fluid under pressure and the other side thereof with exhaust and adapted upon sliding in the opposite direction to connect said one side of said piston with exhaust and said other side of said piston with said source of fluid under pressure, a cam adapted to give said sliding member a reciprocating movement, and means actuated by fluid pressure for urging said sliding member in opposition to said cam.

16. In a grinding machine, in combination, work supporting means, a wheel adapted to engage work upon said supporting means, a slide adapted to be moved to change the relation between said wheel and said work, a double acting piston connected to move said slide, a source of fluid under pressure, and a valve mechanism for controlling the flow of said fluid to and from said piston, said valve mechanism comprising a sliding member adapted upon sliding in one direction to connect one side of said piston with said source of fluid under pressure and the other side thereof with exhaust and adapted upon sliding in the opposite direction to connect said one side of said piston with exhaust and said other side of said piston with said source of fluid under pressure, a cam surface adapted to give said sliding member a reciprocating movement, means actuated by fluid pressure for urging said sliding member in a direction to be actuated by said cam surface, and manually operated means for rendering ineffective said last means and for directing said fluid pressure to urge said sliding member in the opposite direction thereby to render said cam ineffective and to hold said sliding member at one end of its path of movement.

17. In a grinding machine, in combination, work supporting means, a wheel adapted to engage work upon said supporting means, a slide adapted to be moved to change the relation between said wheel and said work, a double acting piston connected to move said slide, a source of fluid under pressure, and a valve mechanism for controlling the flow of said fluid to and from said piston, said valve mechanism comprising a sliding member adapted upon sliding in one direction to connect one side of said piston with said source of fluid under pressure and the other side thereof with exhaust and adapted upon sliding in the opposite direction to connect said one side of said piston with exhaust and said other side of said piston with said source of fluid under pressure, means adapted to give said sliding member a reciprocating movement, and means actuated by fluid pressure adapted to render said last means ineffective and to hold said sliding member in a predetermined position.

18. In a grinding machine, in combination, work supporting means a wheel adapted to engage work upon said supporting means, a slide adapted to be moved to change the relation between said wheel and said work, a double acting piston connected to move said slide, a source of fluid under pressure, and a valve mechanism for controlling the flow of said fluid to and from said piston, said valve mechanism comprising a sliding member adapted upon sliding in one direction to connect one side of said piston with said source of fluid under pressure and the other side thereof with exhaust and adapted upon sliding in the opposite direction to connect said one side of said piston with exhaust and said other side of said piston with said source of fluid under pressure, means adapted to give said sliding member a reciprocating movement, means actuated by fluid pressure normally urging said member in one direction during said reciprocating movement thereof, and manually operated means for controlling said fluid and for reversing the actuation of said last means thereby to render said reciprocating means ineffective and to hold said sliding member in a predetermined position.

19. In a grinding machine, in combination, work supporting means, a wheel adapted to engage work upon said supporting means, a slide adapted to be moved to change the relation between said wheel and said work, a double acting piston connected to move said slide, a source of fluid under pressure, and a valve mechanism for controlling the flow of said fluid to and from said piston, said valve mechanism comprising a sliding member adapted upon sliding in one direction to connect one side of said piston with said source of fluid under pressure and the other side thereof with exhaust and adapted upon sliding in the opposite direction to connect said one side of said piston with exhaust and said other side of said piston with said source of fluid under pressure, said sliding valve member having connected thereto a piston-like member, a cam surface adapted to give said sliding valve member a reciprocating movement, and a manually operated valve means for admitting fluid pressure to said piston-like member thereby to urge said sliding member in a direction to render said cam ineffective.

20. In a grinding machine, in combination, a grinding wheel, a regulating wheel, means for supporting work between said wheels, means for giving said regulating wheel a reciprocating movement toward and away from said grinding wheel, means for reciprocating said grinding wheel axially, means for removing work from said work support, and a rotating cam shaft for controlling the actuation of said last three means.

21. In a grinding machine, in combination, a grinding wheel, a regulating wheel, means for supporting work between said wheels, means for giving said regulating wheel a reciprocating movement toward and away from said grinding wheel, means for removing work from said work support, a rotating cam shaft for actuating said last two means, said cam shaft including two sections which respectively actuate said two means, and means connecting said two sections together for relative angular adjustment thereof.

22. In a grinding machine, in combination, a grinding wheel, a regulating wheel, means for supporting work between said wheels, means for giving said regulating wheel a reciprocating movement toward and away from said grinding wheel, means for removing work from said work support, a rotating cam shaft for actuating said last two means, said cam shaft including two sections which respectively actuate said two means, and a speed change mechanism through which said cam shaft is driven for adjusting its speed of rotation.

23. In a grinding machine, in combination, a grinding wheel, a regulating wheel, means for supporting work between said wheels, means for giving said regulating wheel a reciprocating movement toward and away from said grinding wheel, means for reciprocating said grinding wheel axially, means for removing work from said work support, a rotating cam shaft for controlling the actuation of said last three means, said cam shaft including three sections which respectively actuate said three means, and means connecting said three sections to rotate as a unit and adapted to permit relative angular adjustment thereof.

24. In a grinding machine, in combination, a grinding wheel, a shaft upon which said wheel is mounted, and means for reciprocating said shaft axially in its bearings comprising a rotating cam and a lever, said lever including two portions angularly adjustable with respect to each other about the pivot of said lever.

25. In a grinding machine, in combination, a grinding wheel, a shaft upon which said wheel is mounted, means for reciprocating said shaft axially in its bearings comprising a cam, a lever, a pivot about which said lever swings, said lever being built up of two separable arms, namely, an arm on one side of said pivot engaging said cam and the other arm on another side of said pivot engaging said shaft, and means for rigidly connecting together said two arms to swing as a unit about said pivot.

26. In a grinding machine, in combination, a grinding wheel, a shaft upon which said wheel is mounted, means for reciprocating said shaft axially in its bearings comprising a cam, a lever, a pivot about which said lever swings, said lever comprising an arm on one side of said pivot engaging said cam and an arm on another side of said pivot engaging said shaft, and means for rigidly connecting together said two arms to swing as a unit about said pivot, said connecting means being adjustable to permit swinging of one of said arms relative to the other and into a position to render said cam inoperative to reciprocate said shaft.

27. In a grinding machine, in combination, a grinding wheel, a shaft upon which said wheel is mounted, and means for reciprocating said shaft axially in its bearings comprising a cam and a lever acting between said cam and said shaft, means adapted to permit adjustment of said lever into a position out of engagement with said cam and means for locking said lever in said last position.

28. In a grinding machine, in combination, a grinding wheel, a shaft upon which said wheel is mounted, and means for reciprocating said shaft axially in its bearings comprising a lever and means for rocking said lever about its pivot, said lever comprising two parts adjustably connected together and adapted to be adjusted with respect to each other to interrupt the reciprocation of said shaft.

29. In a grinding machine, in combination, a grinding wheel, a shaft upon which said wheel is mounted, and means for reciprocating said shaft axially in its bearings comprising a lever and a rotating cam for rocking said lever about its pivot, said lever comprising an arm on one side of said pivot engaging said cam and an arm on the other side of said pivot engaging said shaft and means connecting said two arms together to swing as a unit, said connecting means being adjustable to permit adjustment of said first arm relative to said second arm and into a position out of engagement with said cam, and means for locking said lever against swinging about said pivot.

30. In a grinding machine, in combination, a grinding wheel, a shaft upon which said wheel is mounted, a sleeve about an end portion of said shaft, means for giving said sleeve a reciprocating movement in a direction substantially axially on said shaft, an anti-friction thrust bearing within said sleeve and through which the movements of said sleeve are imparted to said shaft, and a threaded plug in the end of said sleeve engaging a part of said bearing and adapted to be threaded inwardly to take up wear in said bearing.

31. In a grinding machine, in combination, a grinding wheel, a shaft upon which said wheel is mounted, a sleeve about an end portion of said shaft, means for giving said sleeve a reciprocating movement in a direction substantially axially of said shaft, a bearing race fastened upon said shaft within said sleeve, a set of bearing balls on either side of said race, a pair of bearing races carried by said sleeve, and means upon said sleeve for drawing said last two bearing races toward each other to clamp said sets of balls and said first race therebetween.

32. In a grinding machine, in combination, a grinding wheel, a shaft upon which said wheel is mounted, a sleeve about an end portion of said shaft, means for giving said sleeve a reciprocating movement in a direction substantially axially of said shaft, a part projecting radially from said shaft within said sleeve, and a plug threaded into the end of said sleeve, said sleeve having an inner shoulder between which and said plug said radially projecting part is clamped to connect said sleeve to transmit the reciprocating movement thereof to said shaft.

33. In a grinding machine, in combination, a grinding wheel, a spindle upon which said wheel is mounted, a carriage in which said spindle is rotatably supported, said carriage being movable in a direction substantially transverse to the axis of said spindle, a rotating shaft extending adjacent to an end portion of said grinding wheel spindle and substantially parallel to said direction of movement of said carriage, a pair of spaced bearing supports for said shaft secured to said carriage and movable therewith lengthwise of said shaft, a cam splined upon said shaft between said bearing supports, and means actuated by said cam adapted to reciprocate said grinding wheel spindle axially.

34. In a grinding machine, in combination, a grinding wheel, a regulating wheel, a slide in which said grinding wheel is mounted and movable toward and away from said regulating wheel, a feed screw for moving and adjusting the position of said slide, a clamping member, and means upon said slide for cooperating with said clamping member to lock said slide in the position to which it is adjusted, said means being of such length that it remains in operative relation to said clamp throughout the range of movement of said slide.

35. In a grinding machine, in combination, a grinding wheel, a regulating wheel, means actuated by fluid pressure for moving one of said wheels toward and away from the other, a fluid supply tank, a feed pipe for leading fluid under pressure to said fluid actuated means, a constantly driven pump adapted to draw fluid from said tank and deliver it under pressure into said feed pipe, a bypass leading from said feed pipe to said tank, and a valve in said bypass adapted to be opened when the fluid pressure is not required and to permit said pump to discharge therethrough directly into said tank.

36. In a grinding machine, in combination, a pair of wheels made of abrasive material and rotated at respective speeds and in respective directions to effect rotation and grinding of round work presented thereto, means for holding work of round section in operative relation to said two wheels, a slide on which one of said wheels is mounted and movable toward and away from the other of said wheels, a frame on which said slide is slidably mounted, means associated with said slide and including a portion having a length substantially equal to the range of movement of said slide, a member carried by said frame and adapted to engage said portion, and means including a manually operable member for causing said member to force and clamp said slide against said frame.

37. In a grinding machine, in combination, a pair of wheels made of abrasive material and rotated at respective speeds and in respective directions to effect rotation and grinding of round work presented thereto, means for holding work of round section in operative relation to said two wheels, a slide on which one of said wheels is mounted and movable toward and away from the other of said wheels, a frame on which said slide is slidably mounted, means associated with said slide and including a portion having a length substantially equal to the range of movement of said slide, a member carried by said frame and adapted to engage said portion, and means on said frame and including an eccentric adapted upon actuation to cause said member to clamp said slide against said frame.

38. In a grinding machine, in combination, a pair of wheels made of abrasive material and rotated at respective speeds and in respective directions to effect rotation and grinding of round work presented thereto, means for holding work of round section in operative relation to said two wheels, a slide on which one of said wheels is mounted and movable toward and away from the other of said wheels, a frame on which said slide is slidably mounted, a substantially hook-shaped member carried by said frame and having its hook-shaped portion overlapping a portion of said slide, and means for actuating said hook-shaped member to clamp said member against said frame, the portion of said slide engageable by said hook-shaped member being of a length commensurate with the range of travel of said slide.

39. In a grinding machine, in combination, a grinding wheel, means for holding work in operative relation to said wheel, a slide on which said grinding wheel is mounted and movable toward or away from said work-holding means, and clamping means for clamping said slide to said frame and including a part carried by and relatively fixed with respect to said frame, said clamping means being constructed and arranged to be effective throughout the range of movement of said slide.

CLEMENT BOOTH.